United States Patent
Voegele et al.

[11] Patent Number: 6,065,346
[45] Date of Patent: May 23, 2000

[54] MEASUREMENT SYSTEM UTILIZING A SENSOR FORMED ON A SILICON ON INSULATOR STRUCTURE

[75] Inventors: Kevin D. Voegele, Shakopee; Thomas G. Stratton, Roseville; Russell L. Johnson, New Brighton, all of Minn.

[73] Assignee: Honeywell Inc., Minneapolis, Minn.

[21] Appl. No.: 09/277,903

[22] Filed: Mar. 29, 1999

[51] Int. Cl.[7] .................................. G01L 9/00; G01L 9/16
[52] U.S. Cl. ........................................................ 73/754
[58] Field of Search ............................ 73/179, 754, 384; 437/901; 200/19 R, 20, 52 R; 250/206, 553; 257/734, 798, 231

[56] References Cited

U.S. PATENT DOCUMENTS

| 3,805,062 | 4/1974 | Michon et al. | 257/231 |
| 4,539,843 | 9/1985 | Wise | 73/179 |

*Primary Examiner*—William Oen
*Attorney, Agent, or Firm*—Kris T. Fredrick

[57] ABSTRACT

A measurement system utilizes a sensor formed in a semiconductor on insulator structure that has an offset related to the time that power is applied. A controller applies power, obtains readings and removes power so as to minimize any effect of the offset.

10 Claims, 2 Drawing Sheets

MEASUREMENT SYSTEM UTILIZING A SENSOR FORMED ON A SILICON ON INSULATOR STRUCTURE

BACKGROUND OF THE INVENTION

The present invention relates generally to semiconductor based sensors and specifically to semiconductor on insulator based sensors. A diaphragm type silicon based pressure sensor will be used as an example to describe a problem with sensors in the past. Such a pressure sensor will typically include piezoresistors positioned to sense strain associated with pressure and arranged in a Wheatstone bridge to which a direct current voltage is applied. The output voltage of the bridge is representative of the pressure that is being sensed. When no pressure is sensed the output of the bridge should be zero or null. Slight differences in the bridge resistors or other causes will typically produce some initial offset from null upon power up of the bridge. A power up drift (PUD) phenomena has been observed in silicon based sensors that is not explained by a small thermal rise that may occur after power is applied to the sensor.

The PUD phenomena is apparently a result of charges present in a silicon chip or on the surface of a silicon chip, which have one preferred configuration with power off and a second preferred configuration with power on. That is, these charges move in response to the application of voltage to the silicon chip. As the charges move they apparently affect the characteristics of the circuit elements on the chip. The charges may reside in any of a number of locations in the integrated circuit. They may be in the silicon, in insulating layers on or under the silicon, at the interfaces between two of these layers, or at the surface of the silicon chip. The defects may be charge defects such as dangling bonds, or may be charged impurity ions. This PUD phenomena is typically of little consequence for digital circuit as the change in charge location usually results in circuit changes which are much smaller than the rail voltages used. Sensors, including pressure sensors, are often designed with a bridge configuration to minimize this, and other performance limitations. In a bridge configuration, the change of any one element resulting from the redistribution of charges on power up is not significant as long as its balancing element undergoes the same change. Therefore great care is usually taken in the design of a sensor to insure that the individual elements of the bridge are as identical as possible. The power-up drift of the bridge output "resets" itself after the power is removed to the value that existed before power was applied. Also, the stabilization time of the power-on condition is characteristically longer than the "reset" time of the power-off condition.

Silicon on insulator (SOI) based sensors offer performance advantages over bulk silicon based sensors. For example, SOI sensors allow the use of higher impedance piezoresistors which reduce the sensor power requirements. The higher impedance can be used because in SOI sensors the piezoresistors are isolated from the silicon substrate by an insulative layer. This is in contrast to sensors formed in bulk silicon where leakage currents exist and lower impedance piezoresistors must be used. The low power requirement allows sensors to be used in new applications. Also, as ambient temperature increases, the leakage problems associated with sensors formed in bulk silicon also increase. However, SOI based sensors have resistors that are isolated from the bulk silicon and these sensors perform well at elevated temperatures.

Where the sensor application is such that power is continuously applied to the sensor or where reduced measurement accuracy is acceptable, the PUD may not be a problem. However, numerous applications for sensors require high accuracy and many applications may dictate that the bridge does not have power continuously applied. For example, the bridge may not be used continuously, but it may be desirable because of power supply constraints or other considerations to take readings a short time after the power is applied to the bridge. Power supply constraints may exist, for example, due to techniques that utilize a number of sensors but only apply power to a particular sensor when a reading is to be obtained from that sensor. This technique may be used with a hardwired multiplexing approach. This technique could also be used where radio frequency (RF) signals are used to obtain sensor readings and provide a signal to the sensor so that power is only applied to the sensor at that time. In addition, in certain power limited applications the power to the sensor may result from conversion of RF signals to a direct current voltage to power the sensor. Thus there is a need for a measurement system that uses a sensor formed on a silicon-on-insulator structure and accommodates the PUD phenomena.

BRIEF SUMMARY OF THE INVENTION

The present invention solves these and other needs by providing a measurement system that utilizes a sensor formed on a semiconductor on insulator structure which has an offset that is related to the time that power is applied. A controller is connected to a switch that applies power to the sensor. The controller closes the switch and obtains a reading during a first period of time. the controller opens the switch for a second period of time sufficient for the sensor to recover to an offset that existed at the beginning of the first period of time. The controller closes the switch for a third period of time and obtains a second reading during said third period of time.

DETAILED DESCRIPTION OF THE INVENTION

Figure 1:
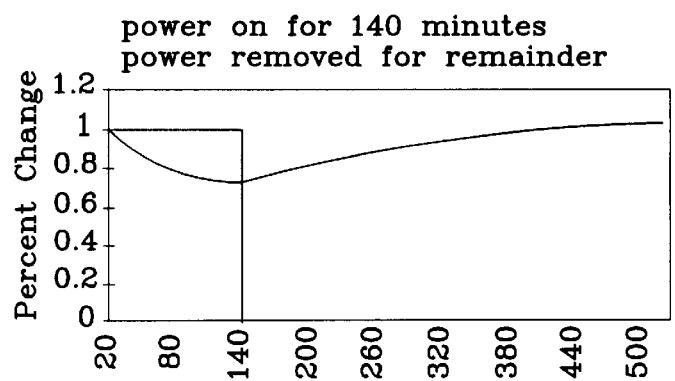
FIG. 1 is a chart showing sensor offset and a square wave showing when sensor power is applied and removed.

FIG. 1 indicates the percent change or PUD after power is applied at 20 minutes until power is removed at 140 minutes for a silicon on insulator based sensor. This drift is observed at varying degrees over all temperatures. Once the power is removed, the offset "resets" itself to the initial offset, that is the offset that existed before the power was applied. The time required after power is applied for the PUD to stabilize is less than the time required for the sensor to "clear" or "reset" after the power is removed. This means that if power is lost after the PUD has stabilized at some sensor output, the power must be off for at least three times the power on time before resetting back to the sensor offset before the power was applied.

Figure 2:
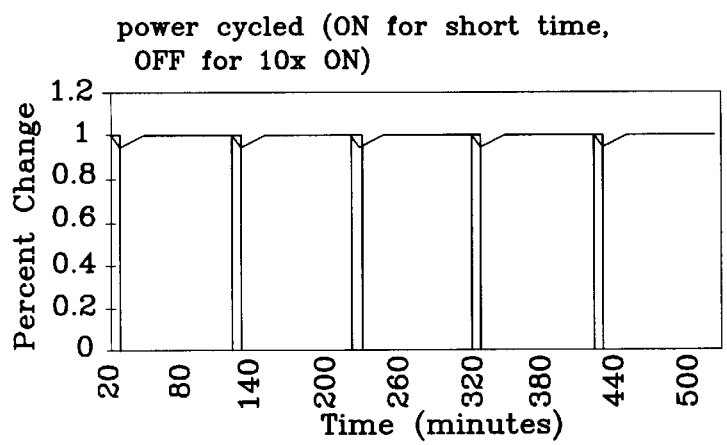
FIG. 2 is a chart showing sensor offset when sensor power is applied and removed according to the principles of the present invention.

FIG. 2 illustrates according to the teachings of the present invention, that by providing a measurement system where power is applied to the sensor for a relatively short time period, as indicated by the square wave, and then removed from the sensor for a substantially longer time, measurements that reduce the PUD may be obtained.

Figure 3:
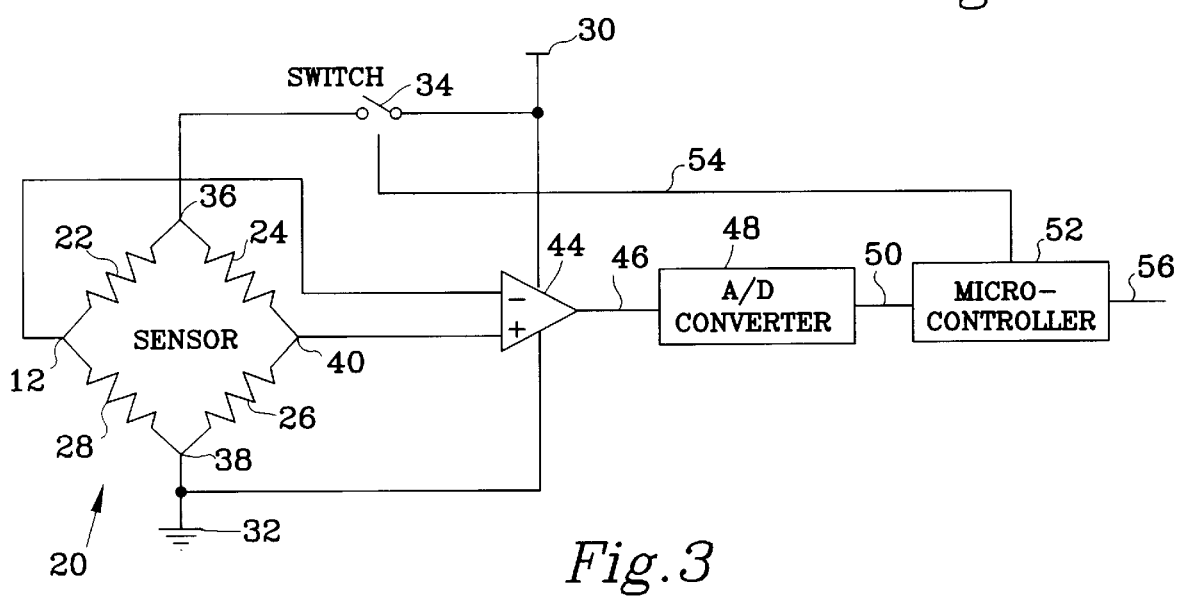
FIG. 3 is a schematic of a measurement system according to the principles of the present invention.

FIG. 3 shows a measurement system according to the teachings of the present invention. A sensor 20 formed on an SOI structure is represented schematically by resistors 22, 24, 26 and 28 which are interconnected into a Wheatstone bridge arrangement. On a pressure sensing device, for example, the resistors would typically be piezoresistors located to sense strain in a silicon diaphragm. A power supply voltage is present at 30 and a reference voltage or ground at 32. When switch 34 is closed, voltage 30 is connected to sensor 20 at 36. Sensor 20 is connected to ground at 38. An output of sensor 20 is taken between 40 and 42 and is applied to amplifier 44. Output 46 of amplifier 44 is input to analog to digital (A/D) converter 48. Output 50 of A/D converter 48 is an input to microcontroller 52.

In operation, switch 34 is closed by output 54 from microcontroller 52 and the difference between 40 and 42 will stabilize at the response of sensor 20 to the condition being sensed. Once amplifier output 46 is stable, an A/D conversion is performed by A/D converter 48. Output 50 is then read by microcontroller 52 and can be transmitted to another system via output 56. Switch 34 is controlled by microcontroller 52 to provide the appropriate ON and OFF time periods. For example, a 6 second ON time and a 54 second OFF time will provide an update rate at output 56 of one sensor conversion per minute. The sensor update ratio will of course be dependent on the particular application.

Microcontroller 52 can be a microprocessor suitably programmed to use an algorithm to periodically close switch 34, provide a period of time for output 46 of amplifier 44 to stabilize, obtain a reading of digital signal 50 and provide a signal at output 56 which is representative of variable being sensed by sensor 20, open switch for a second period of time, and then repeat this sequence to provide updated measurements as desired.

Figure 4:
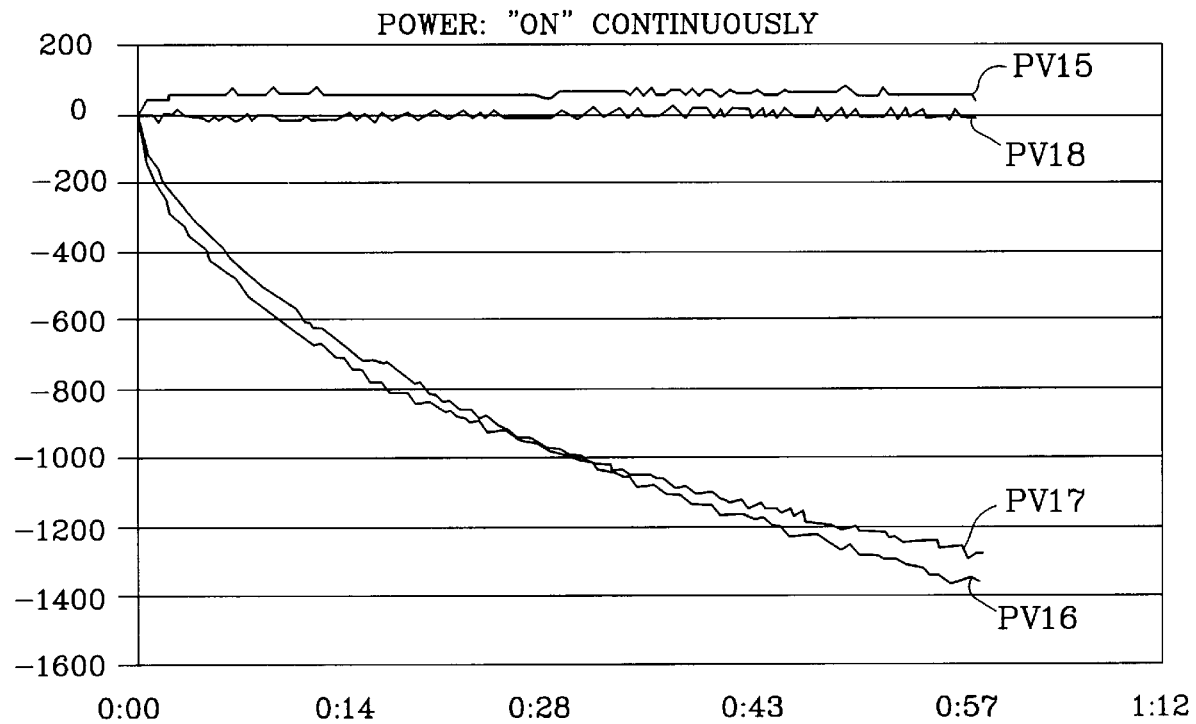
FIG. 4 is a chart showing sensor offset as a function of time after power is applied.
Figure 5:
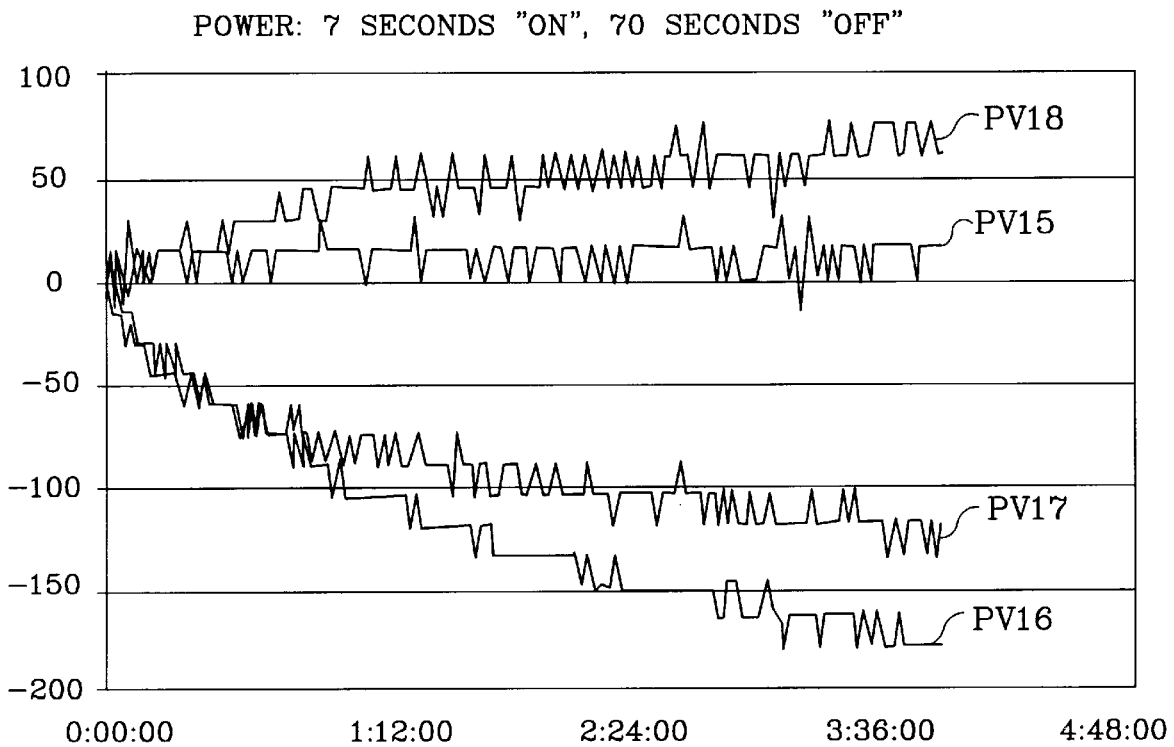
FIG. 5 is a chart showing sensor offset when sensor power is applied and removed according to the principles of the present invention.

FIG. 4 and FIG. 5 show empirical data taken from a circuit that was built to demonstrate the reduction in the offset error utilizing the circuit of the present invention. FIG. 4 shows a baseline PUD in parts per million (ppm) at 25° C. when power was applied for a period of approximately one hour to test devices PV15, PV16, PV17 and PV18. Note that for devices PV16 and PV17 the PUD exceeded 1200 ppm. FIG. 5 shows the PUD for the same test devices at 25° C. when power was repeatedly applied during a first period of 7 seconds and then removed during a second period of 70 seconds. Note that the PUD for all test devices was less than 200 ppm.

The present invention has been described with reference to silicon as the semiconductor material. However, it is to be understood that the present invention is not to be limited to silicon, but applies to other semiconductor materials also. Also, a pressure sensor was used as an example to explain the present invention, but the present invention applies as well to temperature sensors or other types of sensors.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than be the foregoing description, and all changes which come within the meaning and range of equivalency of the claims are intended to be embraced therein.

What is claimed is:

1. A measurement system comprising:

a sensor formed on a semiconductor on insulator structure, said sensor having a power input and an output, said sensor having an offset that is related to the time that power is applied to said input;

a switch connected between a voltage and said sensor input;

a controller having an input and an output, said input coupled to said sensor output, said controller output coupled to said switch; and means operative on said controller for:

(a) closing said switch for a first period of time;

(b) acquiring a first reading;

(c) opening said switch for a second period of time wherein said second period of time is sufficient to allow said sensor to recover to an offset that existed at the beginning of said first period of time;

(d) closing said switch for a third period of time with said third period of time equal to said first period of time; and (e) acquiring a second reading.

2. Measurement system of claim 1 wherein said semiconductor on insulator structure is a silicon on insulator structure.

3. Measurement system of claim 2 wherein said second period of time is at least three times said first period of time.

4. Measurement system of claim 3 wherein said third period of time is approximately equal to said first period of time.

5. A measurement system comprising:

a sensor formed on a silicon on insulator structure, said sensor comprising a bridge configuration having a power input and an output, said sensor having an offset that is related to the time that power is applied to said input;

a switch connected between a voltage and said power input;

a controller having an input and an output, said input coupled to said sensor output, said controller output coupled to said switch; and means operative on said controller for:

(a) closing said switch for a first period of time;

(b) acquiring a first reading;

(c) opening said switch for a second period of time wherein said second period of time is sufficient to allow said sensor to recover to an offset that existed at the beginning of said first period of time;

(d) closing said switch for a third period of time; and (e) acquiring a second reading.

6. Measurement system of claim 5 wherein said second period of time is at least three times said first period of time.

7. Measurement system of claim 6 wherein said third period of time is approximately equal to said first period of time.

8. A method of performing a measurement comprising:

providing a sensor formed on a silicon on insulator structure and having an initial offset value;

energizing said sensor for a first period of time;

acquiring a first reading of a measured variable from said sensor during said first period of time;

de-energizing said sensor for a second period of time wherein said second period of time is sufficient to allow said sensor to recover to said initial offset value;

energizing said sensor for a third period of time equal to said first period of time; and acquiring a second reading of said measured variable during said third period of time.

9. The method of claim 8 wherein said second period of time is at least three times said first period of time.

10. The method of claim 9 wherein said third period of time is approximately equal to said first period of time.

\* \* \* \* \*